US008630902B2

(12) United States Patent
Baum et al.

(10) Patent No.: US 8,630,902 B2
(45) Date of Patent: Jan. 14, 2014

(54) AUTOMATIC CLASSIFICATION OF CONSUMERS INTO MICRO-SEGMENTS

(75) Inventors: Geoff Baum, Palo Alto, CA (US); Walter Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 97 days.

(21) Appl. No.: 13/039,177

(22) Filed: Mar. 2, 2011

(65) Prior Publication Data

US 2012/0226559 A1    Sep. 6, 2012

(51) Int. Cl.
 *G06Q 30/00* (2012.01)
(52) U.S. Cl.
 USPC ............... 705/14.66; 705/14.49; 705/14.43
(58) Field of Classification Search
 USPC ............ 705/14.66, 7.33, 14.52, 14.49, 14.51
 See application file for complete search history.

(56) References Cited

U.S. PATENT DOCUMENTS

| | | | |
|---|---|---|---|
| 5,636,346 A | 6/1997 | Saxe | |
| 5,892,900 A | 4/1999 | Ginter et al. | |
| 6,061,658 A | 5/2000 | Chou et al. | |
| 6,317,872 B1 | 11/2001 | Gee et al. | |
| 6,519,571 B1 | 2/2003 | Guheen et al. | |
| 7,072,858 B1 | 7/2006 | Litzow et al. | |
| 7,174,381 B2 | 2/2007 | Gulko et al. | |
| 7,224,185 B2 | 5/2007 | Campbell et al. | |
| 7,599,851 B2 | 10/2009 | Frengut et al. | |
| 7,992,171 B2 | 8/2011 | Amidon et al. | |
| 2001/0013009 A1* | 8/2001 | Greening et al. ............... 705/10 |
| 2001/0032128 A1 | 10/2001 | Kepecs | |
| 2003/0023482 A1* | 1/2003 | Messner et al. .................. 705/14 |
| 2005/0114366 A1* | 5/2005 | Mathai et al. .................. 707/100 |
| 2006/0095327 A1 | 5/2006 | Vaughn et al. | |
| 2006/0212355 A1 | 9/2006 | Teague | |
| 2007/0230706 A1 | 10/2007 | Youn | |
| 2008/0090513 A1 | 4/2008 | Collins et al. | |
| 2008/0163071 A1* | 7/2008 | Abbott et al. .................. 715/748 |
| 2009/0164441 A1 | 6/2009 | Cheyer | |
| 2009/0271263 A1 | 10/2009 | Regmi et al. | |
| 2010/0042471 A1 | 2/2010 | Chang et al. | |
| 2010/0094878 A1 | 4/2010 | Soroca et al. | |
| 2010/0106568 A1 | 4/2010 | Grimes | |
| 2010/0138867 A1 | 6/2010 | Wong et al. | |
| 2010/0211464 A1 | 8/2010 | Zhu et al. | |
| 2010/0268600 A1 | 10/2010 | Banko et al. | |
| 2012/0226562 A1 | 9/2012 | Baum et al. | |

(Continued)

OTHER PUBLICATIONS

"Lawson M3 Manufacturing Operations: Attribute Control", Lawson Software, Inc. 5636346,(2008), 12 pages.

(Continued)

*Primary Examiner* — John G Weiss
*Assistant Examiner* — Scott C Anderson
(74) *Attorney, Agent, or Firm* — Wolfe-SBMC

(57) ABSTRACT

A campaign is received, at a micro-segmentation system, from an offer provider. The micro-segmentation system is a third-party system. The campaign indicates a set of target attributes and one or more offers corresponding to the set of target attributes. A set of user attributes pertaining to each of the plurality of users is received at the micro-segmentation system. The set of attributes is defined by an attribute knowledge structure. Permission is received at the micro-segmentation system from each of the plurality of users to receive an offer from the micro-segmentation system. Data associated with the micro-segment classification is provided from the micro-segmentation system without user information to the offer provider.

20 Claims, 5 Drawing Sheets

(56) References Cited

U.S. PATENT DOCUMENTS

| | | |
|---|---|---|
| 2012/0226697 A1 | 9/2012 | Chang et al. |
| 2012/0226700 A1 | 9/2012 | Chang et al. |
| 2013/0132220 A1 | 5/2013 | Baum |
| 2013/0132365 A1 | 5/2013 | Chang |

OTHER PUBLICATIONS

"Non-Final Office Action", U.S. Appl. No. 12/862,386, (Oct. 9, 2012), 8 pages.

"Non-Final Office Action", U.S. Appl. No. 13/039,207, (Sep. 13, 2012), 16 pages.

"Non-Final Office Action", U.S. Appl. No. 13/039,242, (Jun. 8, 2012), 10 pages.

"Non-Final Office Action", U.S. Appl. No. 13/039,257, (Jul. 18, 2012), 10 pages.

"Non-Final Office Action", U.S. Appl. No. 13/153,328, (Jun. 8, 2012), 8 pages.

"SQL Tutorials—Lesson 1: SQL Startup", Retrieved from: <http://www.functionx.com/sql/Lesson01.htm> on Aug. 20, 2012,(2004-2007), 4 pages.

De Haan, Lex et al., "Nulls: Nothing to Worry About", Retrieved from: <http://www.oracle.com/technetwork/issue-archive/2005/05-jul/o45sql-097727.html> on Aug. 20, 2012,(Jul. 2005), 1 page.

Preiss, Bruno R., "Data Structures and Algorithms with Object-Oriented Design Patterns in Java", Retreived from: <http://www.brpreiss.com/books/opus5/html/page264.html> on Aug. 20, 2012,(1998), 2 pages.

"Final Office Action", U.S. Appl. No. 12/862,386, (Mar. 26, 2013), 11 pages.

"Final Office Action", U.S. Appl. No. 13/039,207, (Dec. 31, 2012), 13 pages.

"Final Office Action", U.S. Appl. No. 13/039,242, (Jan. 2, 2013), 12 pages.

"Final Office Action", U.S. Appl. No. 13/039,257, (Jan. 3, 2013), 12 pages.

"Final Office Action", U.S. Appl. No. 13/153,328, (Dec. 3, 2012), 14 pages.

"Non-Final Office Action", U.S. Appl. No. 13/039,266, (Mar. 12, 2013), 12 pages.

"Non-Final Office Action", U.S. Appl. No. 13/153,328, (Mar. 20, 2013), 13 pages.

"Updated Final Office Action", U.S. Appl. No. 12/862,386, (Apr. 9, 2013), 12 pages.

Dattero, Ronald et al., "Programming Languages and Gender", *Communications of the ACM*, vol. 47, No. 1, (Jan. 2004), pp. 99-102.

Lam, Wang "The Behavior of NULLs in SQL", Retrieved from: <http://www-cs-students.stanford.edu/'wlam/compsci/sqlnulls>on Dec. 26, 2012, (Aug. 5, 2004), 4 pages.

"Final Office Action", U.S. Appl. No. 12/862,386, (Jun. 26, 2013), 13 pages.

"Final Office Action", U.S. Appl. No. 13/039,266, (Aug. 5, 2013), 14 pages.

"Non-Final Office Action", U.S. Appl. No. 13/039,207, (Aug. 15, 2013), 20 pages.

"Notice of Allowance", U.S. Appl. No. 13/039,257, (Sep. 12, 2013), 14 pages.

"Notice of Allowance", U.S. Appl. No. 13/153,328, (Sep. 4, 2013), 7 pages.

Wen-Xiu, et al., "Market basket analysis based on text segmentation and association rule mining", *First International Conference on Networking and Distributed Computing*, (Oct. 2010), pp. 309-313.

\* cited by examiner

AUTOMATIC CLASSIFICATION OF CONSUMERS INTO MICRO-SEGMENTS

BACKGROUND

1. Field

This disclosure generally relates to classification of consumers. More particularly, the disclosure relates to automatic classification of consumers into micro-segments.

2. General Background

Content providers, merchants, and marketers have to precisely define and target highly specific market segments in order to effectively deliver the most relevant online content. Examples of the most relevant online content are advertising, offers, entertainment, news, etc.

A micro-segment is a precise division of a market or population that is typically identified by marketers through advanced technology and techniques. For example, data mining, artificial intelligence, and various algorithms may be utilized. These technologies and techniques are utilized to group consumers into fine-grained segments by recognizing and predicting minute consumer spending and behavioral patterns, i.e., micro-segmentation. In other words, a micro-segment is a group of (purchase) decision makers who share similar attributes, purchase behavior, and/or level of interest in a specific set of features. In the current environment, however, classifying and segmenting a new user community into micro-segments may be difficult for a number of reasons. In particular, consumers are increasingly filtering content and marketing messages, which reduces marketer efficacy. Further, even as more consumer data and behaviors are collected, most are under-utilized because of the lack of industry expertise and limitations of available technology. In addition, meaningful segmentation within newly created user communities and populations is difficult.

Further, segmentation difficulties also affect numerous websites that leverage the recorded behaviors of large numbers of site users in determining recommended content, products, and services for various user segments. Recommendation systems utilize algorithms that may vary from k-nearest neighborhood approaches to preference/interest/taste similarity methods, e.g., found by using Pearson Correlation, to collaborative filtering algorithms, e.g., people who buy X also buy Y. A challenge with all of these approaches is having an accurate segmentation of very large user populations based on recorded preferences and behaviors before the system can make recommendations.

SUMMARY

In one aspect of the disclosure, a computer program product is provided. The computer program product includes a computer useable medium having a computer readable program. The computer readable program when executed on a computer causes the computer to receive, at a micro-segmentation system, a campaign from an offer provider. The micro-segmentation system is a third-party system. The campaign indicates a set of target attributes. Further, the computer readable program when executed on the computer causes the computer to receive, at the micro-segmentation system, a set of user attributes pertaining to each of the plurality of users and one or more offers corresponding to the set of target attributes. The set of attributes is defined by an attribute knowledge structure. In addition, the computer readable program when executed on the computer causes the computer to receive, at the micro-segmentation system, permission from each of the plurality of users to receive an offer from the micro-segmentation system. The computer readable program when executed on the computer also causes the computer to process, at the micro-segmentation system, a micro-segment definition, the campaign, and the set of target attributes to determine a micro-segment classification from the plurality of users that each have a match between the set of user attributes and the set of target attributes. Further, the computer readable program when executed on the computer also causes the computer to provide, from the micro-segmentation system, data associated with the micro-segment classification without user information to the offer provider. The set of attributes is defined by an attribute knowledge structure. In addition, the computer readable program when executed on the computer also causes the computer to receive, at the micro-segmentation system, the offer based on the data associated with the micro-segment from the offer provider. The computer readable program when executed on the computer also causes the computer to provide, from the micro-segmentation system, the offer based on the data associated with the micro-segment classification to users in the micro-segment classification.

In another aspect of the disclosure, a process is provided. The process receives, at a micro-segmentation system, a campaign from an offer provider. The micro-segmentation system is a third-party system. The campaign indicates a set of target attributes. Further, the process receives, at the micro-segmentation system, a set of user attributes pertaining to each of the plurality of users and one or more offers corresponding to the set of target attributes. The set of attributes is defined by an attribute knowledge structure. In addition, the process receives, at the micro-segmentation system, permission from each of the plurality of users to receive an offer from the micro-segmentation system. The process also processes, with a processor in the micro-segmentation system, a micro-segment definition, the campaign, and the set of target attributes to determine a micro-segment classification from the plurality of users that each has a match between the set of user attributes and the set of target attributes. Further, the process provides, from the micro-segmentation system, data associated with the micro-segment classification without user information to the offer provider. In addition, the process receives, at the micro-segmentation system, the offer based on the data associated with the micro-segment from the offer provider. The process also provides, from the micro-segmentation system, the offer based on the data associated with the micro-segment classification to users in the micro-segment classification.

In yet another aspect of the disclosure, a system is provided. The system includes a micro-segmentation reception module that receives (i) a campaign from an offer provider, (ii) a set of user attributes pertaining to each of the plurality of users, (iii) permission from each of the plurality of users that to receive an offer, and (iv) the offer based on data associated with a micro-segment classification from the offer provider, the campaign indicating a set of target attributes and one or more offers corresponding to the set of target attributes. Further, the system includes a micro-segmentation processor that processes a micro-segment definition, the campaign, and the set of target attributes to determine the micro-segment classification from the plurality of users that each have a match between the set of user attributes and the set of target attributes. In addition, the system includes a micro-segmentation transmission module that sends data associated with the micro-segment classification without user information to the offer provider and the offer based on the data associated with the micro-segment classification to users in the micro-segment classification.

DRAWINGS

The above-mentioned features of the present disclosure will become more apparent with reference to the following description taken in conjunction with the accompanying drawings wherein like reference numerals denote like elements and in which.

DETAILED DESCRIPTION

A micro-segmentation method, system, and computer program product are provided to automatically classify users into a micro-segment. Numerous high-value micro-segments within newly created user communities may be identified and created. Advertisers and marketers can automate the creation of customized micro-segments to which they can deliver highly targeted and relevant content across a range of multimedia devices. After the micro-segments are identified, they can be utilized to automate the delivery of content, personalized direct micro-marketing, and micro-promotion campaigns, which target and appeal to the specified tastes, needs, wants, and desires of the member individuals. Micro-marketing is the process by which the system models each consumer as having different ideas and feelings about a company's products, services, prices, and promotions, and appeals to them in an appropriate manner. A consumer refers to a user who is a consumer and utilizes the configurations provided for herein. The micro-segments provide a finer level of granularity than segments. Accordingly, the micro-segments may assist marketers in recognizing and predicting minute consumer spending and behavioral patterns. For example, the micro-segments may be utilized to leverage data sources such as core demographics, category spending over time, fine-grained purchase history, and buying intent. Some of these data sources such as purchase history and category spending may be validated as they are coming from third parties, e.g., credit card companies. As a result, marketers are able to provide more accurate, precise, and targeted offers.

Further, membership within micro-segments may be incrementally and continuously updated within micro-segments. In addition, intentional semantics may be automatically detected and extracted utilizing behavioral and natural language processing ("NLP") information.

Further, recommendations may be quickly and accurately generated regarding content, products and services to users within each micro-segment. A recommendation system may be utilized to perform the recommendations. The recommendation system is a system that employs information clustering and filtering techniques that attempt to recommend information content or product items that are likely to be of interest to a specific user (consumer) based on the cluster or segment he or she is in. In one embodiment, a recommendation system compares a user's behaviors and/or explicit profile to some reference characteristics and then seeks to predict the interest 'rating' that a user would give to an item they may have not yet considered. These characteristics may be from the information or product item (using a content-based and/or attribute approach) or the user's social environment (using collaborative filtering approaches).

Figure 1:
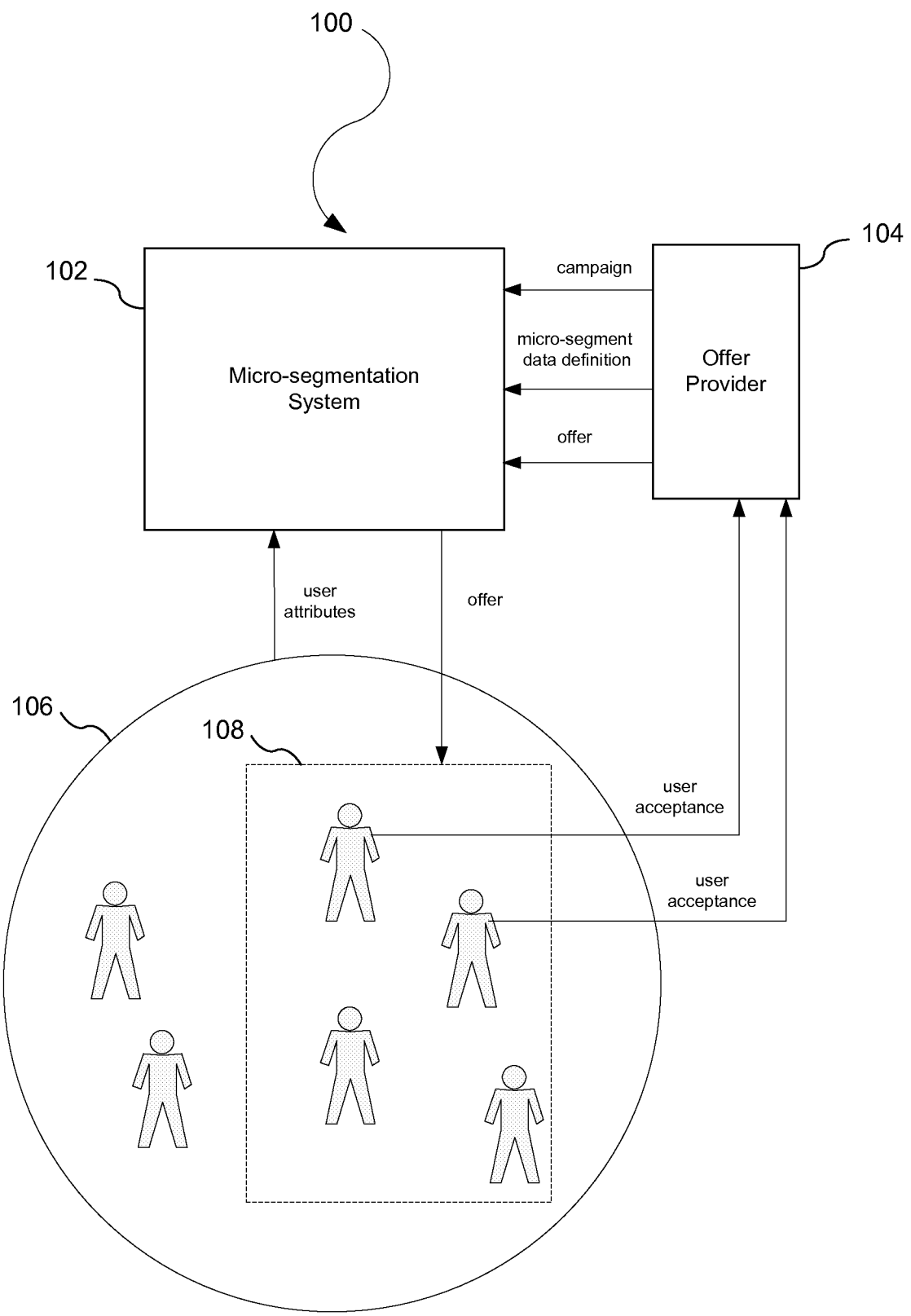
FIG. 1 illustrates a micro-segmentation system configuration.

In one embodiment, each micro-segment includes a specific set of key discriminating features ("KDFs") that defines a group of attributes utilized by decision makers and a volume or value figure to indicate the micro-segment size. FIG. 1 illustrates a micro-segmentation system configuration 100. The micro-segmentation system configuration 100 has a micro-segmentation system 102 that is a third-party trusted system between a merchant 104 and each of a plurality of users 106. The offer provider 104 may be a company selling a product, a company selling a service, a marketing company, an advertising company, or the like that provides a campaign to the micro-segmentation system. The campaign indicates a set of target attributes that the offer provider is looking for in marketing to particular users for a product or service. Accordingly, the set of target attributes refers to the set of attributes the campaign is targeting. As an example, the campaign may be an offer for sale of men's sneakers in the United States of America. The micro-segmentation system 102 receives that campaign and also receives user attributes from the plurality of users 106. The attributes are properties or characteristics. An example of an attribute is gender. Accordingly, the values for the gender attribute may be male or female. The micro-segmentation system 102 then performs a determination of which users in the plurality of users 106 have user attribute values that match the target attributes of the campaign. In other words, the micro-segmentation system 102 evaluates the created micro-segment definitions, attributes values, and value distributions to determine the selectivity of the specific micro-segment. The micro-segmentation system 102 determines a micro-segment 108 that includes users that match the target attributes of the campaign. In one embodiment, all of the target attributes have to equal the user attributes in order for the user to be placed into the micro-segment 108. In another embodiment, a minimum matching score has to be met for the user to be placed into the micro-segment 108. As an example, a user may not have to match all of the attributes, but may match enough of the attributes to generate a score that exceeds the offer provider's minimum threshold and places the consumer in to micro-segment 108. In another embodiment, a weighting mechanism is utilized to weigh certain attributes as opposed to other attributes in the scoring methodology. For example, an age attribute may have a higher weighting in the scoring calculation than a geographic attribute. In one embodiment, the system compensates for attribute bias to prevent attribute overweighting. Similarly, marketers may be allowed to customize the weightings of micro-segment attributes in determining the selectivity of the micro-segment relative to candidate users.

In one embodiment, after the micro-segmentation system 102 automatically classifies users into the micro-segment 108, the micro-segmentation system 102 sends a micro-segment data definition to the offer provider 104. In one embodiment, the micro-segmentation system 102 captures default definitions and/or training data for classifying existing and/or new users. The quantity of segment definitions may range anywhere from a few to billions based upon the number of ways user attributes are combined and utilized. In another embodiment, that micro-segment data definition does not include personal identity information of the users in the micro-segment. In other words, the plurality of users provide attribute information to the micro-segmentation system 102 on a trusted basis such that the micro-segmentation system does not send information that personally identifies the users to the offer provider 104. The system may not send any data to the offer provider other than representative statistics or general statistics about the micro-segment they defined. As an example, a micro-segment may contain twenty seven thousand three hundred thirty two consumers. After the offer has been delivered, seventeen thousand three hundred forty four consumers looked at the offer, three thousand four hundred forty four consumers clicked on the offer to learn more, and six hundred thirty four consumers purchased the offer. Further, in one embodiment, the plurality of users 106 provides permission to the micro-segmentation system 102 to send them offers. The micro-segment data definition received by the offer provider 104 provides information such as the number of users in the micro-segment, their attribute values, etc. The offer provider 104 can quickly determine potential interest in a campaign among a target audience, without wasting advertising and resources on people who have no interest in receiving advertising for this specific campaign. As a result, the offer provider 104 can realistically determine if the campaign is economically feasible and the amount of resources that should be dedicated to the campaign, etc. The offer provider can then send an offer to the micro-segmentation system 102 based on the micro-segment data. In other words, the offer provider 104 is not sending the offer directly to the micro-segment 108. After receiving the offer, the micro-segmentation system may then send the offer to the micro-segment. If users in the micro-segment would like to learn more about the offer or accept the offer, the users may then individually contact the offer provider by following a link provided in the offer. In another embodiment, micro-segment data other than the micro-segment data definition may also be sent to the offer provider 104. As an example, campaign performance statistics may be sent to the offer provider after the delivery of the campaign in addition to the micro-segment data definition.

In one embodiment, the micro-segmentation system 102 also performs recommendations. The micro-segmentation system 102 may deliver a recommendation to the user. In one embodiment, given any user, the micro-segmentation system 102 quickly locates all assigned micro-segments and then utilizes the assigned micro-segments to locate product, service, and/or content offers based on the matching micro-segments to generate specific recommendations. Further, the micro-segmentation system 102 may store data regarding the recommendations upon which the user acts.

In one embodiment, before each user is classified, that user is scored against all relevant micro-segments to determine the most probably classifications. Further, micro-segment classifications may be efficiently assigned to users and searchable in real-time.

Figure 2:
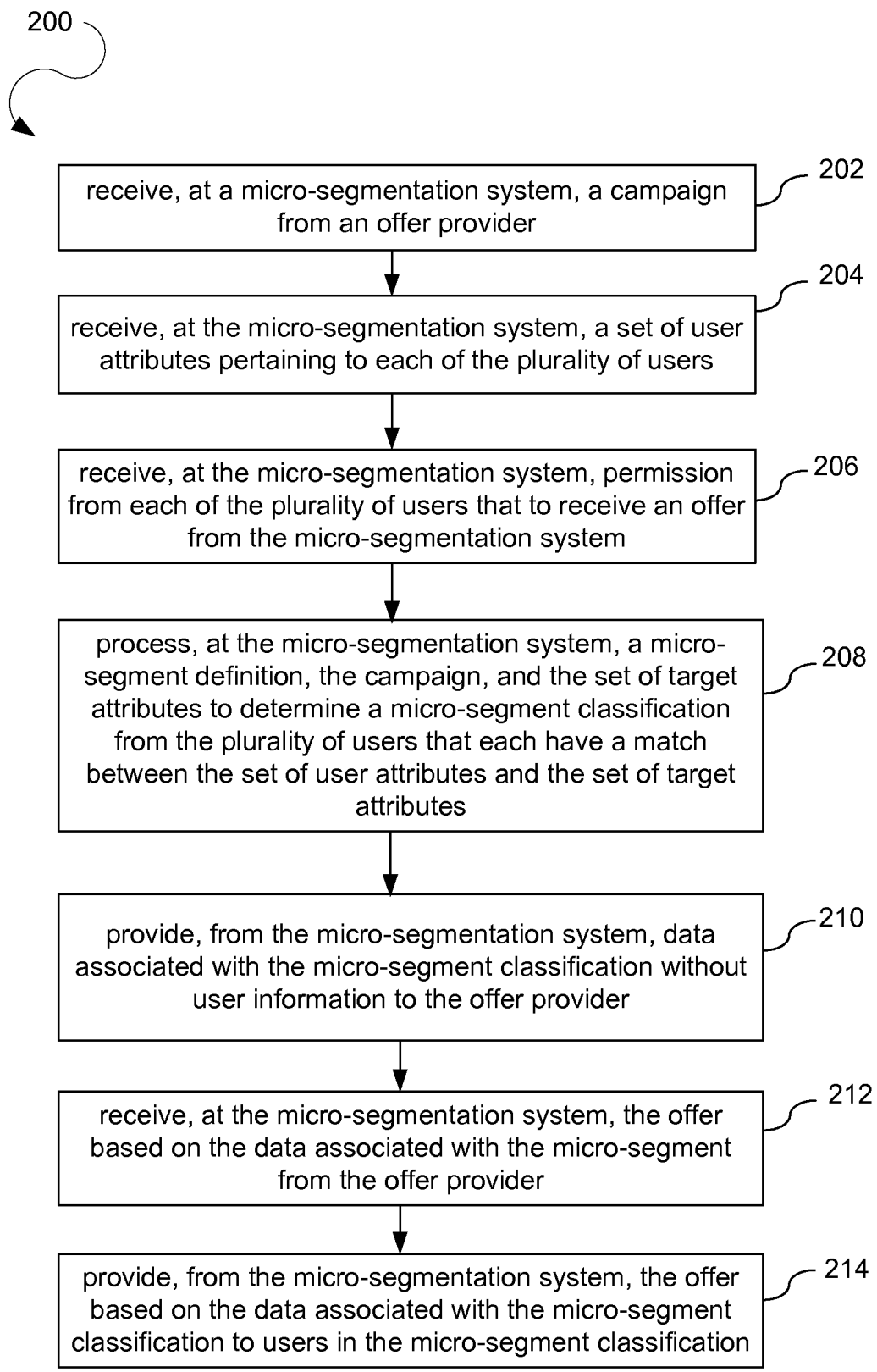
FIG. 2 illustrates a process that is utilized for micro-segment classification.

FIG. 2 illustrates a process 200 that is utilized for micro-segment classification. At a process block 202, the process 200 receives, at a micro-segmentation system, a campaign from an offer provider. The micro-segmentation system is a third-party system. In one embodiment, the third-party system is trusted by both the offer provider and a plurality of users. The campaign indicates a set of target attributes. Further, at a process bock 204, the process 200 receives, at the micro-segmentation system, a set of user attributes pertaining to each of the plurality of users. The set of user attributes is defined by an attribute knowledge structure. An attribute knowledge structure refers to a taxonomy or ontology that records the data types, constraints, rules, and semantics for each user data attribute. In addition, the attribute knowledge structure captures data attributes that are organized in a hierarchical way and thus related to each other through parent-child relationships. For example, an ontology provides a formal definition for the set of user attributes. In one embodiment, a meta description of the user's attribute data only has to be sent once to the system, but the user's attribute data is sent to the system or retrieved by the system each time a request is made to classify a user into one or more micro-segments and then to subsequently match against the offer inventory. The user attribute data is distinct from the meta description of the user attribute data. As an example, the user attribute data may be "Johns' Age=41" whereas the meta description of the user attribute data may be "Age is an integer in the range of 0 to 120 years old." Utilizing both the meta description of the user's attribute data and the user attribute data makes the system more efficient as additional data overhead is reduced and expression executions are optimized to provide for faster performance and runtime checking. In another embodiment, the meta description is sent to the system once and a priori before micro-segment classification based on user attribute data. In addition, at a process bock 206, the process 200 receives, at the micro-segmentation system, permission from each of the plurality of users that receive an offer from the micro-segmentation system. At a process block 208, the process 200 also processes, with a processor in the micro-segmentation system, a micro-segment definition, the campaign, and the set of target attributes to determine a micro-segment classification from the plurality of users that each has a match between the set of user attributes and the set of target attributes. Further, at a process block 210, the process 200 provides, from the micro-segmentation system, data associated with the micro-segment classification without user information to the offer provider. The data refers to any additional anonymity-preserving information about the match. As examples, the data associated with the micro-segment classification may include a score, an approximate number of consumers in the micro-segment, an approximate number of consumers in the micro-segment above a threshold to avoid small micro-segment populations, and/or other statistics about the micro-segment classification. The user information may be user identification information, user contact information, or any other information that is specific to the user. In addition, at a process block 212, the process 200 receives, at the micro-segmentation system, the offer based on the data associated with the micro-segment from the offer provider. At a process block 214, the process 200 also provides, from the micro-segmentation system, the offer based on the data associated with the micro-segment classification to users in the micro-segment classification.

Figure 3:
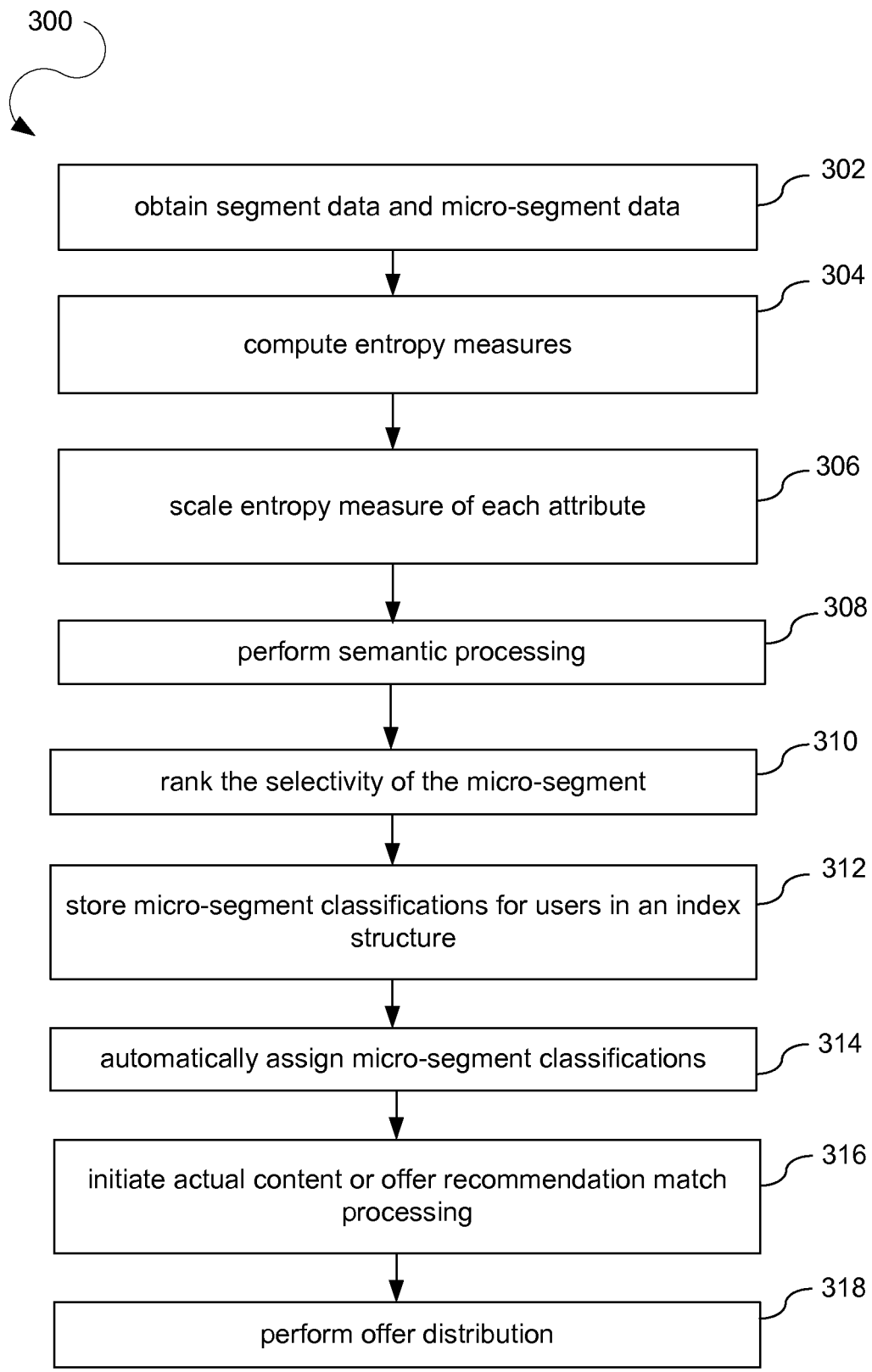
FIG. 3 illustrates another process that may be utilized to perform automatic classification of consumers into a micro-segment.

FIG. 3 illustrates another process 300 that may be utilized to perform automatic classification of consumers into a micro-segment. At a process block 302, the process 300 obtains segment data and micro-segment data. In particular, a set of segment and micro-segment definitions are obtained from open-source or published sources. The set of segment and micro-segment definitions are then collected, processed, and normalized. After being collected and validated, the data is normalized into a relational (tabular) format for further statistical processing. Further, at a process block 304, the process 300 computes entropy measures. Entropy is the measure of the amount of information that is missing before reception. Utilizing the initial (unevaluated) segment definitions, entropy measures are computed for all attributes using the attribute value cardinality (unique count) and the attribute value distributions represented by the Cumulative Distribution Functions for all values of each attribute. The cumulative distribution function or distribution function describes the probability that a real-valued random variable X with a given probability distribution will be found at a value less than or equal to x. Intuitively, it is the "area so far" function of the probability distribution. Cumulative distribution functions are also used to specify the distribution of multivariate random variables. Each measure in turn is used to indicate the initial selectivity of the particular attribute for the specific micro-segment. In addition, at a process block 306, the process 300 scales the entropy measure of each attribute. To prevent attribute overweighting, attribute bias is compensated for by scaling the entropy measure of each attribute with an appropriate weight value. Marketers may also utilize this approach to explicitly define a micro-segment in which they wish to place more importance on a specific attribute or set of attributes. In one embodiment, weights are empirically determined by machine learning. At a process block 308, the process 300 performs semantic processing. The semantic processing captures, normalizes, and classifies all semantic attributes, e.g. interest and/or purchase categories, into more generic interest categories. Further, the semantic processing weights the semantic attributes to contribute to the total micro-segment selectivity score. In addition, at a process block 310, the process 300 ranks the selectivity of the micro-segment. The combination of demographic, semantic, and other attribute entropy scores is utilized to rank the selectivity of the micro-segment. This ranking allows the system to efficiently score users against all possible relevant micro-segments. At a process block 314, the process 300 stores the micro-segment classifications for users in an index structure. Examples of the index structure include, but are not limited to a B-tree or persistent hash table. In one embodiment, a non-normal relational form is utilized. Multiple micro-segment codes are stored and maintained within a single lexical index in the non-normal relational form to provide for faster search lookup. Further, at a process block 314, the process 300 automatically assigns micro-segment classifications. In one embodiment, micro-segment classifications are automatically assigned to any identified content, products, and offers in order to allow for fast matching against the micro-segment classifications assigned to users at the process block 312. All micro-segment assignments to users, content, and product/offers can occur at the time source data (user, content, offer data) are first captured by the system, or at a later time, e.g., as an off-line batch process. In addition, at a process block 316, the process 300 initiates actual content or offer recommendation match processing. In one embodiment, specific events such as external request or user login will initiate the actual content or offer recommendation processing. For any user, the system locates all micro-segment codes using the lexical index and forms a micro-segment "feature vector" which is utilized for offers by matching with the micro-segment feature vector of all offers in the system inventory. In one embodiment, at least three matching modes based on feature vector similarity are possible: (1) Strict Boolean set intersection: A* B, (2) Use of Jaccard similarity coefficient: J(A,B), or (3) Cosine similarity: T(A,B). Further, at a process block 318, the process 300 performs offer distribution. For example, recommendations may be delivered to the user by webpage, direct email, or other content distribution method to a variety of devices. A component tracks how users react to each offer and optionally provides a rewards/incentive system when users act on recommended offers.

Figure 4:
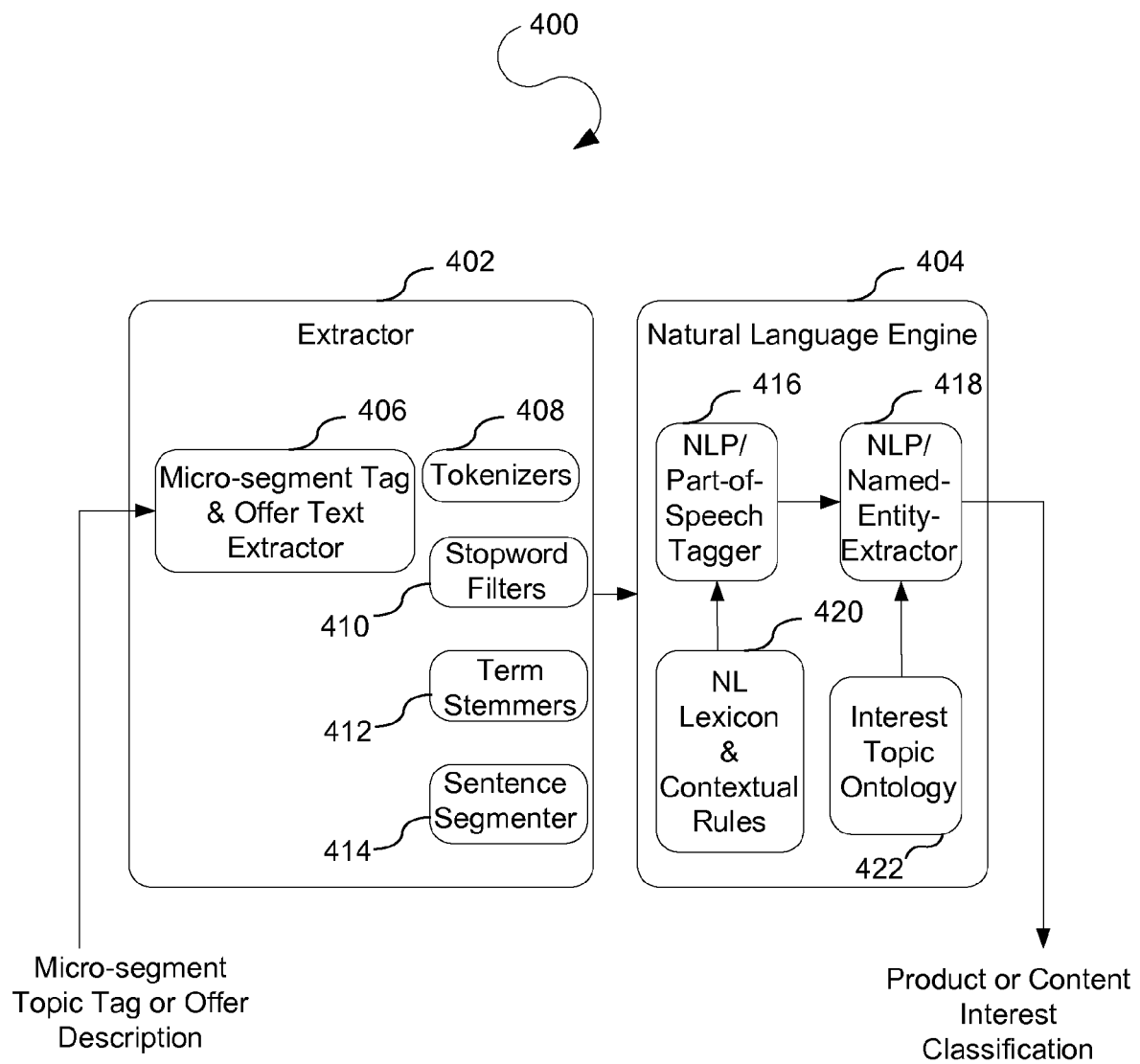
FIG. 4 illustrates a semantic configuration that performs the semantic processing at the process block illustrated in FIG. 3.

FIG. 4 illustrates a semantic configuration 400 that performs the semantic processing at the process block 308 illustrated in FIG. 3. In one embodiment, the semantic configuration 400 has an extractor 402 and a natural language engine 404. As an example, the extractor 402 receives a micro-segment topic tag or offer description. The extractor 402 has a micro-segment Tag and Offer Text Extractor 406 that identifies and extracts interest and purchase tags. Further, the micro-segment Tag and Offer Text Extractor 406 captures free-form content or offer descriptions. The extractor may utilize tokenizers 408, stopword filters 410, term stemmers 412, and sentence segmenter 414 to perform the semantic processing. The extractor then submits the text to the natural language engine 404. Initially, the text is submitted to an NLP Part-of-Speech Tagger 416 to identify regular and proper noun phrases by consulting Natural Language ("NL") Lexicon and Contextual Grammar Rules 420. All noun phrases are further processed by an NLP Named-Entity-Extractor 418 which utilizes an Interest Topic Ontology 422 to produce classifications meaningful to each micro-segment. The Interest Topic Ontology 422 may be built based on storing information about the likes or dislikes of a user. In one embodiment, users are provided with rewards for providing feedback regarding certain potential interests. Rewards may be given for both likes and dislikes. The natural language engine 404 then outputs the product or interest classification.

Calculations may be performed to determine the automatic classification provided herein. In one embodiment, the upper bounds on the number of micro-segments given n attributes taken k at a time, i.e., number of attribute combinations, are determined. The number of micro-segments is given by |S|, which is the set of all possible micro-segments formed by considering n data attributes k at a time. For example, $S=\{s_1, s_2, \ldots, s_n\}$. Further, $|S|=N=\Sigma(n,k)$ from k=0 to n=$2^n$ where (n,k) is a k-combination of n. If n=0 is not counted, then across all k the total number of meaningful micro-segments is given by $|S|=2^n-1$. Further, the micro-segment membership certainty=(1−uncertainty or entropy) is computed. A Cumulative Distribution Function ("CDF") may be utilized. The entropy for each micro-segment attribute $X_{Aj}$ attribute CDF=Prob($X_i$) is initially computed according to $H(X_{Aj})=-\Sigma \text{Prob}(X_i) \log_b \text{Prob}(X_i)$ from i=1 through n. The m normalized attribute weighting coefficients $\omega_j$'s where $0 \leq \omega_j \leq 1$ are then computed. A combination of machine learning over provided micro-segment sample dataset(s) and/or a priori values representing any marketer specified attribute bias (e.g., overweight HHI>AGE) are utilized. In addition, any/all Topical behavior/interest attributes in the total micro-segment entropy calculation are included. The Natural Language Engine 404 illustrated in FIG. 4 may then be utilized to extract the topic interest category attributes, which are then ranked and weighted by a combination of the following: (1) CDF: likelihood of topic label applied to user, (2) an assigned uncertainty for the attribute, (3) metrics based on affinity to sample populations, and/or (4) interest strength measured by a Term Frequency-Inverse Document Frequency ("TF-IDF") equivalent metric. Further, the micro-segment row-ordered entropy matrix is formed and the matrix is sorted using total weighted entropy for each micro-segment. The sort rank order is utilized to assign micro-segment classification (un)certainty values to each micro-segment. The users and items (content, product, and/or service offers) are then indexed by micro-segment, use index-based matching to perform real-time matching of users to offer/content items by micro-segment ID intersection or feature vector ("FV") similarity. If the two micro-segment FVs (sets) are represented by (A,B), then FV similarity is performed using a combination of: (1) Boolean set intersection (A* B), (2) Jaccard similarity, and/or (3) Cosine similarity.

The automatic classification configurations provided herein allow for the automatic placement of users into segments defined from other publicly available or proprietary sources without the need for existing user population. Further, users may be rapidly ("on-the-fly") segmented into fine-grained micro-segments, which improves scalability. In addition, the automatic classification configurations provide real-time performance of matching users with content, products, and services. The automatic classification configurations provide scaling fast user/content matching to large numbers of micro-segments, e.g., $2^{64}$ combinations. As a result, the automatic classification configurations support a large number of small-cardinality micro-segments. The automatic classification configurations also introduce non-ambiguous user cluster labels for users with common attributes, which are named, persistent, and easily shared and searched among marketers. In one configuration, each user's membership in a segment is associated with a score. Accordingly, marketers may refer to and target highly specific consumer segments without disclosing the identities of the consumers within the segment. Further, the automatic classification increases matching relevance.

In addition, the automatic classification configurations provided herein allow for the generation of micro-segments that are first class objects. These first class objects are portable and reusable for consumers in particular micro-segments. The automatic classification configurations provided herein also allow for leveraging existing segments to be utilized in micro-segments in a network of consumers. Accordingly, the automatic classification configurations provided herein provide a fast way to obtain new users and/or offer inventories by leveraging predefined existing segments.

In one embodiment, the user provides permission or does not provide permission to receive offers from the micro-segmentation system 102 illustrated in FIG. 1. In one embodiment, a user-based policy configuration may be utilized in conjunction with any of the automatic classification configurations provided for herein. The user may define a policy that regarding when and how that user is willing to accept advertising. Further, the user may define policies about how marketers are allowed to utilize any information that is provided by the user to a marketer. The user's data is protected according to the user-defined policies. In one embodiment, a digital rights management ("DRM") system may be utilized to implement the user-based policy configuration.

In another embodiment, the micro-segmentation system 102 may receive a fee from the offer provider for providing the micro-segment data and/or a fee from the user for providing data to the third party trusted service for offers. In yet another embodiment, the micro-segmentation system can receive a price or price range from a consumer regarding a product or service. The micro-segmentation system 102 can then provide that price or price range to the offer provider 104 to determine if the offer provider 104 can provide an offer of the product or service at that price. The micro-segmentation system 102 may also ask other offer entities. In another embodiment, the micro-segmentation system 102 may provide a bidding system between the user's price or price range and potential offer entities that bid for that price or price range.

Figure 5:
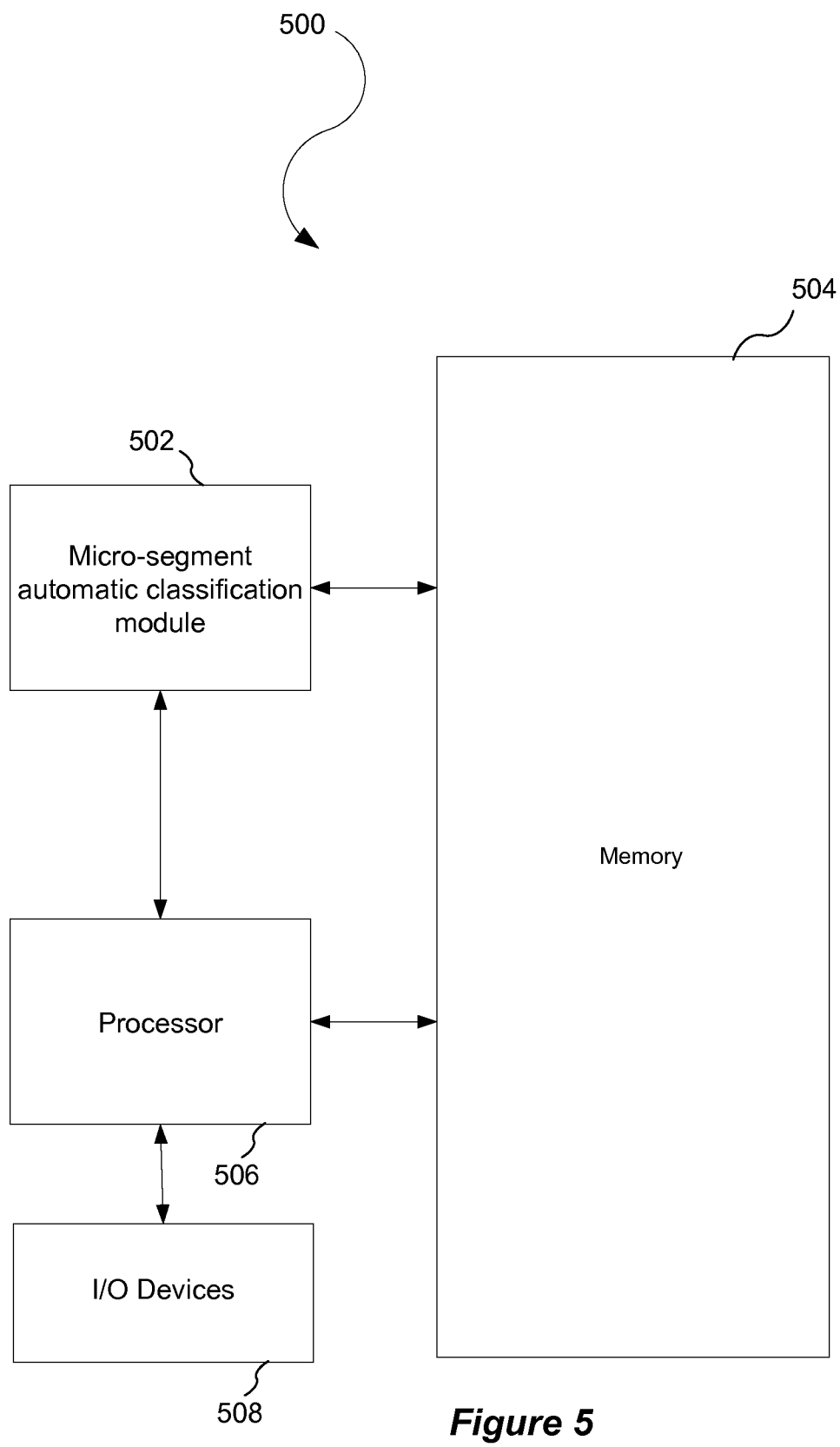
FIG. 5 illustrates a system configuration that may be utilized for micro-segment automatic classification.

FIG. 5 illustrates a system configuration 500 that may be utilized for micro-segment automatic classification. In one embodiment, a micro-segment automatic classification module 502 interacts with a memory 504. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer program product comprising a computer readable storage device having a computer readable program, stored thereon that, when executed on a computer cause the computer to:

receive, at a micro-segmentation system, a campaign from an offer provider, the micro-segmentation system being a third-party system separate from the offer provider and users to which offers are provided by the offer provider, the campaign indicating a set of target attributes and one or more offers corresponding to the set of target attributes;

receive, at the micro-segmentation system, a set of user attributes pertaining to each of a plurality of users, the set of attributes being defined by an attribute knowledge structure;

receive, at the micro-segmentation system, permission from each of the plurality of users to receive an offer from the micro-segmentation system;

process, at the micro-segmentation system, a micro-segment definition, the campaign, and the set of target attributes to determine a micro-segment classification from the plurality of users that each have a match between the set of user attributes and the set of target attributes by computing selectivity scores that reflect a weighted combination of demographic attributes indicative of user characteristics and semantic attributes indicative of interest classifications extracted through natural language processing of offer descriptions for each of the plurality of users against multiple different micro-segments defined by the micro-segmentation system and assigning users to the micro-segment classification based at least in part upon the selectivity scores that are computed;

provide, from the micro-segmentation system, data associated with the micro-segment classification without user information to the offer provider;

receive, at the micro-segmentation system, the offer based on the data associated with the micro-segment from the offer provider; and provide, from the micro-segmentation system, the offer based on the data associated with the micro-segment classification to users in the micro-segment classification.

2. The computer program product of claim 1, wherein the computer readable program when executed on the computer is further caused to calculate a score based upon a quantity of the user attributes equaling a quantity of the target attributes.

3. The computer program product of claim 2, wherein the computer readable program when executed on the computer is further caused to determine the match by comparing the score to a predetermined score threshold.

4. The computer program product of claim 1, wherein the computer readable program when executed on the computer is further configured to generate recommendations for products, services, and content for a particular user based upon the micro-segment classification.

5. The computer program product of claim 1, wherein the offer provider is a merchant.

6. The computer program product of claim 1, wherein the offer provider is an advertiser.

7. The computer program product of claim 1, wherein the offer provider is a marketer.

8. A method comprising:

receiving, at a micro-segmentation system, a campaign from an offer provider, the micro-segmentation system being a third-party system separate from the offer provider and users to which offers are provided by the offer provider, the campaign indicating a set of target attributes and one or more offers corresponding to the set of target attributes;

receiving, at the micro-segmentation system, a set of user attributes pertaining to each of a plurality of users, the set of attributes being defined by an attribute knowledge structure;

receiving, at the micro-segmentation system, permission from each of the plurality of users to receive an offer from the micro-segmentation system;

processing, with a processor in the micro-segmentation system, a micro-segment definition, the campaign, and the set of target attributes to determine a micro-segment classification from the plurality of users that each have a match between the set of user attributes and the set of target attributes based at least in part upon selectivity scores that are computed for each of the plurality of users against multiple different micro-segments as a weighted combination of demographic attributes indicative of user characteristics and semantic attributes for interest classifications detected through behavioral and natural language processing of offer descriptions and micro-segment tags;

providing, from the micro-segmentation system, data associated with the micro-segment classification without user information to the offer provider;

receiving, at the micro-segmentation system, the offer based on the data associated with the micro-segment from the offer provider; and providing, from the micro-segmentation system, the offer based on the data associated with the micro-segment classification to users in the micro-segment classification.

9. The method of claim 8, further comprising calculating a score based upon a quantity of the user attributes equaling a quantity of the target attributes.

10. The method of claim 9, further comprising determining the match by comparing the score to a predetermined score threshold.

11. The method of claim 8, further comprising generating a recommendation for at least one of a product, service, or content for a user based upon the micro-segment classification.

12. The method of claim 8, wherein the offer provider is a merchant.

13. The method of claim 8, wherein the offer provider is an advertiser.

14. The method of claim 8, wherein the offer provider is a marketer.

15. A system comprising:

a micro-segmentation reception module configured to receive (i) a campaign from an offer provider, (ii) a set of user attributes pertaining to each of the plurality of users defined by an attribute knowledge structure, (iii) permission from each of a plurality of users to receive an offer, and (iv) the offer based on data associated with a micro-segment classification from the offer provider, the campaign indicating a set of target attributes and one or more offers corresponding to the set of target attributes;

a micro-segmentation processor configured to process a micro-segment definition, the campaign, and the set of target attributes to determine the micro-segment classification from the plurality of users that each have a match between the set of user attributes and the set of target attributes, the micro-segmentation processor configured to perform semantic processing including natural language processing of offer descriptions to produce semantic attributes indicative of interests used to score the plurality of users against multiple different micro-segments defined by the micro-segmentation system; and a micro-segmentation transmission module configured to send data associated with the micro-segment classification without user information to the offer provider and the offer based on the data associated with the micro-segment classification to users in the micro-segment classification.

16. The system of claim 15, wherein the micro-segmentation processor is configured to calculate a score based upon a quantity of the user attributes equaling a quantity of the target attributes.

17. The system of claim 16, wherein the micro-segmentation processor determines the match by comparing the score to a predetermined score threshold.

18. The system of claim 15, wherein the micro-segmentation processor is configured to generate a recommendation for at least one of a product, service, or content for a user based upon the micro-segment classification.

19. The system of claim 15, wherein the offer provider is a merchant.

20. The system of claim 15, wherein the offer provider is an advertiser.

* * * * *